C. B. SHELDON.

Furniture-Casters.

No. 137,250. Patented March 25, 1873.

Witnesses:
Chas. Nida
Alex F. Roberts

Inventor:
C. B. Sheldon
Per Munn & Co
Attorneys.

UNITED STATES PATENT OFFICE.

CEVEDRA B. SHELDON, OF NEW YORK, N. Y.

IMPROVEMENT IN FURNITURE-CASTERS.

Specification forming part of Letters Patent No. 137,250, dated March 25, 1873.

*To all whom it may concern:*

Be it known that I, CEVEDRA B. SHELDON, of the city, county, and State of New York, have invented a new and Improved Trunk-Caster, of which the following is a specification:

The object of this invention is to improve the means of protecting trunk-casters from injury; and it consists in securing the cup, in which the caster-ball is placed and customarily revolves, in a cavity formed in the bottom of the trunk, by means of tongues or clips struck up from the sheet metal lining said cavity, as hereinafter described.

Figure 1:
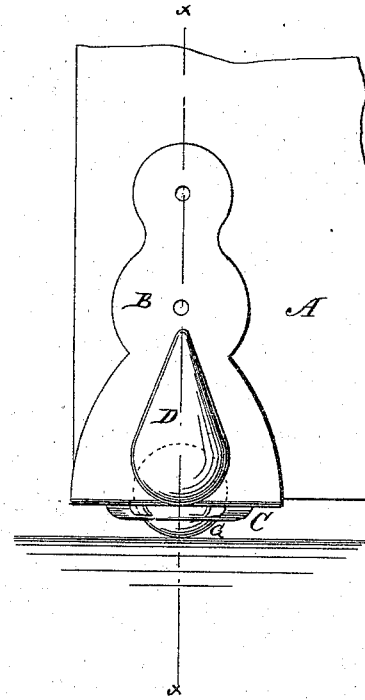
Figure 2:
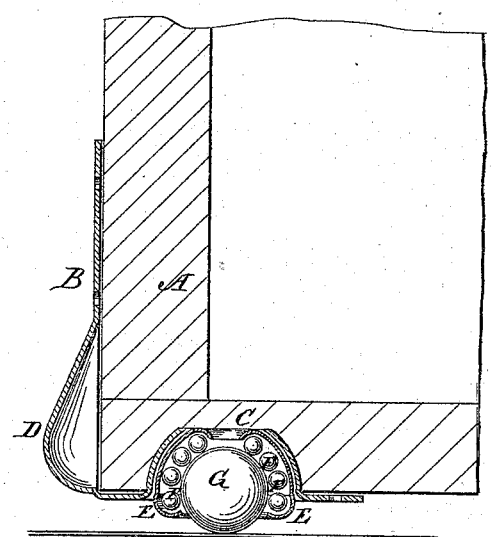
Figure 3:
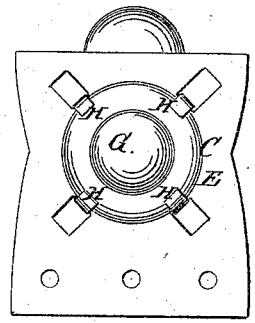

Figure 1 is an outside view of the bumper and caster attached to a trunk. Fig. 2 is a vertical section of Fig. 1 on the line $x$ $x$. Fig. 3 is a view of the bottom of the bumper.

Similar letters of reference indicate corresponding parts.

A represents the trunk. B is the bumper. C is the caster. The ball G of the caster and small friction-balls F are secured in a sheet-metal cup, E. A conical cavity is formed in the bottom of the trunk, and a sheet-metal plate is struck up to fit therein. This plate may be in one piece with the bumper B or separate from it. The cup E is inserted in the socket thus prepared for it, and tongues or clips H, previously struck up from the plate lining the cavity, are bent over its rim or circular edge to hold it firmly in place.

Thus arranged, the caster will withstand severe concussions or great pressure, and the cup, with its contained balls, may be readily removed when necessary or desired.

Having thus described my invention, what I claim as new, and desire to secure by Letters Patent, is—

The ball-holding cup E secured in the cavity of the trunk-frame by means of the clips or tongues H, struck from the metal plate lining the cavity, and bent over the rim of said cup, as specified.

CEVEDRA B. SHELDON.

Witnesses:
 T. B. MOSHER,
 ALEX. F. ROBERTS.